Nov. 1, 1927.
J. H. ASHBAUGH
REGULATOR SYSTEM
Filed June 24, 1924
1,647,333
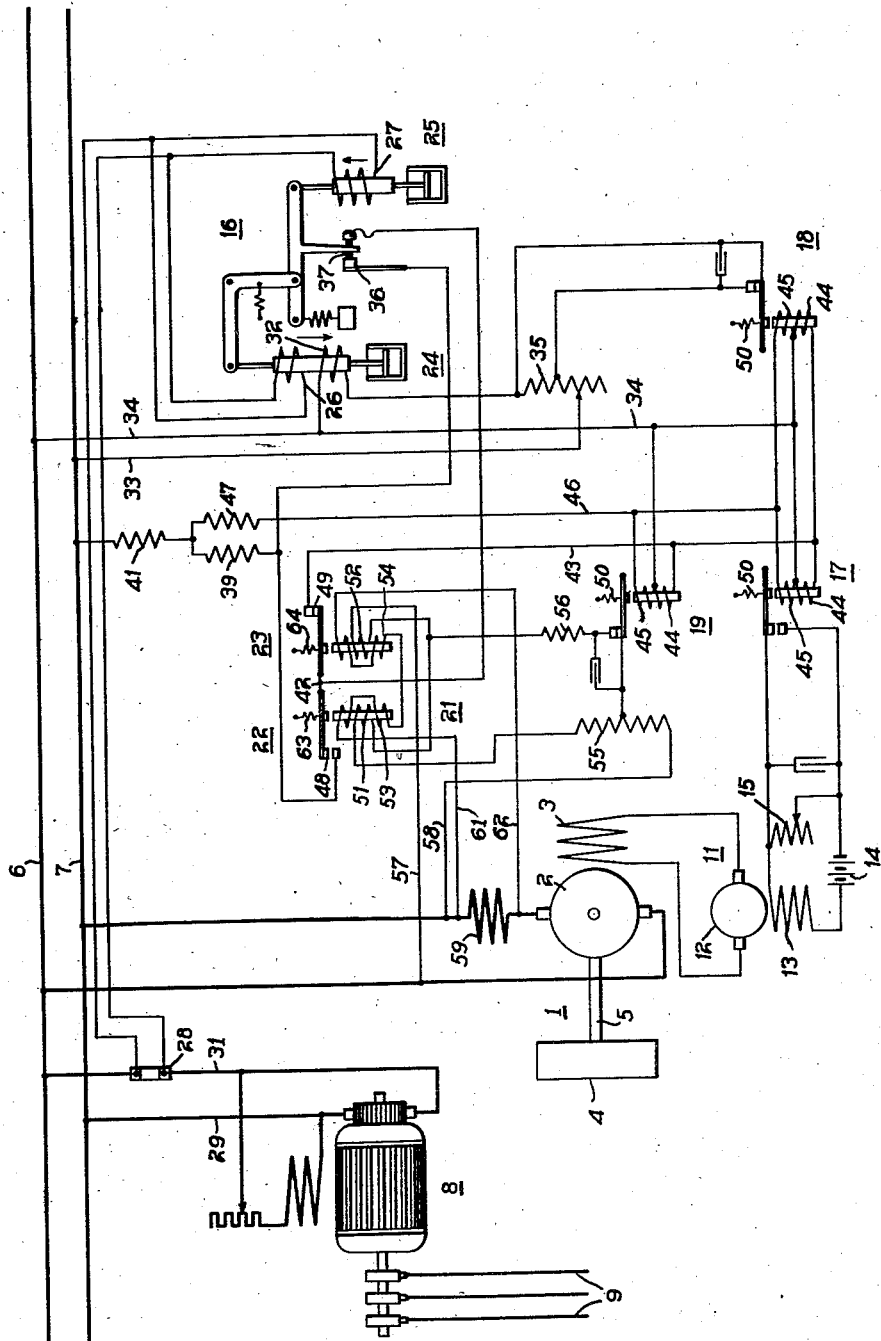
WITNESSES:
INVENTOR
John Harvey Ashbaugh
BY
ATTORNEY Patented Nov. 1, 1927.

1,647,333

UNITED STATES PATENT OFFICE.

JOHN HARVEY ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 24, 1924. Serial No. 722,049.

My invention relates to flywheel balancer sets and more particularly to regulators therefor. In certain power applications, such as motor-operated hoists, and other machinery which temporarily draws heavily upon the power line supplying energy, it becomes necessary to provide means for reducing the high peak loads upon the source of energy supply. It is customary to provide a balancer set comprising a flywheel and a dynamo-electric machine, which may act as a generator or as an electric motor, to absorb power from the line and to return power to the line by varying the speed of the flywheel.

One object of my invention is to produce a regulating system for controlling the current supplied by a balancer set of the above-indicated character, in accordance with the energy required to be supplied by a power source.

Another object of my invention is to provide current-limiting means for a system of the above-indicated character, to prevent the flow of power through said balancer machine from exceeding a safe value. More particularly, the current-limiting means comprising my invention relates to means for interrupting the action of the regulating means in accordance with predetermined increases in the motor load and in the generator load of the balancer machine.

My invention comprises a constant-current regulator of the vibrating type, operating on the flywheel balancer set to cause this machine to deliver power under peak load conditions and absorb power under low load conditions of the power supply source. The vibrating regulator is provided with two current coils that are energized from a shunt connected in series relation with the source of energy supply for the main power line.

If the excitation of the balancer machine is changed rapidly and exceeds certain limits, the power which the machine will deliver, as a result of the flywheel acting as a prime mover, will exceed the safe limit on the machine. Likewise, if the excitation is reduced in order to speed the machine up while acting as a motor, the power input may exceed the safe limit. I have, therefore, devised an adequate protective equipment which comprises two watt relays, one being so connected as to operate on excess of out-going power and the other on excess of in-coming power, to thereby properly limit the operation of the regulator.

My invention will be better understood with reference to the accompanying drawing, wherein the single figure is a diagrammatic view of a regulating system organized in accordance with my invention.

Referring to the accompanying drawing, a balancer set 1 is provided comprising a dynamo-electric machine having an armature winding 2 and a field winding 3. A flywheel 4 is coupled to the dynamo-electric machine by means of a shaft 5, the machine being electrically connected to a direct-current power line 6—7. Electrical machinery (not shown) may be connected to the power line 6—7 and be supplied with energy therefrom. This power line is supplied with energy from any suitable source 8, indicated as a rotary converter receiving energy from a three-phase alternating-current line 9. The field winding 3 is energized from an exciter generator 11 that is provided with an armature winding 12 and a field winding 13. The field winding of the exciter generator is energized from a source of energy, such as a battery 14, which is connected in series-circuit relation with the field winding and with a resistor 15.

A regulator, indicated generally at 16 and of a familiar vibratory type, controls the effective value of the resistor 15 through the operation of a relay 17 and also controls relays 18 and 19, to be referred to later. A current-limiting device 21, comprising a pair of watt relays 22 and 23, is provided to temporarily interrupt the control of the excitation of the dynamo-electric machine by the regulator 16.

The regulator 16 comprises a pair of electro-magnets 24 and 25, which are respectively provided with coils 26 and 27 that are energized from a shunt 28. The shunt 28 is traversed by the load current of one of the conductors 29—31, which supply energy to the power line 6—7. The magnet 24 is also provided with a voltage coil 32 that is energized from the power line 6—7 and is connected thereto through a resistor 35 by means of conductors 33 and 34. The relay 18 shunts a portion of the resistor 35 in accordance with the operation of the regulator 16 and thereby gives a vibratory action to the magnet 24.

The regulator 16 is provided with a pair of contact members 36 and 37, which control the operation of the relays 17, 18 and 19. The contact member 36 is connected, through resistors 39 and 41, to the conductor 7 of the power line. The contact member 37 is connected, through junction-point 42, intermediate relays 22 and 23, contact members 49 of the relay 23, conductor 43, the parallel-connected lower coils 44 of the relays 17, 18 and 19 and conductor 34, to the line conductor 6 of the power circuit.

Each of the relays 17, 18 and 19 comprises an electro-magnet that is provided with a pair of differentially wound coils 44 and 45. Each coil 45 is continually energized from the circuit 6—7 through conductors 34 and 46 and resistors 47 and 41. The energization of each coil 45 is such as to normally attract the armature of the corresponding relay, against the action of a tension spring 50. Upon closing of the main regulator contact members 36 and 37, thus energizing the differentially wound coils 44, the action of the coils 45 becomes neutralized, permitting the tension springs 50 to actuate the relay armatures upwardly.

The current-limiting relays 22 and 23 are respectively provided with contact members 48 and 49. The contact members 49 are connected in series-circuit relation with the contact members 36 and 37 of the main regulator 16, while the contact members 48 are connected in parallel-circuit relation to the contact members 36 and 37. The relays 22 and 23 comprise voltage coils 51 and 52 and current coils 53 and 54. The voltage coils 51 and 52 are so connected through resistors 55 and 56, by means of conductors 57 and 58, as to be energized in accordance with the voltage of the balancer machine. The current coils 53 and 54 are so connected across the interpole winding 59 of the balancer machine, by means of conductors 61 and 62, as to be energized in accordance with the current being absorbed or delivered by the balancer machine. The voltage and current coils of the relays 22 and 23 are wound so that the relays are sensitive to the watts or power consumed or delivered by the balancer machine. The relay 19 interrupts the circuit through resistor 56, in accordance with the operation of the main regulator 16, and thereby gives a vibratory action to the relays 22 and 23. This vibratory action of the relays 22 and 23 prevents hunting action of the current-limiting device.

The operation of the system is as follows: The regulator 16, which is actuated in accordance with the load upon the source of energy supply to the power circuit 6—7, governs the field excitation of the balancer dynamo-electric machine so that it may operate as a motor or as a generator, depending upon the load required from the source.

Assuming that the armature 2 of the balancer machine is supplying energy to the line 6—7, that is, that it is acting as a generator driven by the flywheel 14 acting as a prime mover, and that the power required is such that the regulator 16 increases the excitation of the field winding 3 to a point where a further increase would be unsafe for the machine, the relay 22 will be energized to such a degree that it will pull down the relay armature against the action of the tension spring 63 to effect engagement of the contact members 48 and thereby complete a circuit in parallel to that of the main contact members 36—37, thus energizing the differential windings 44 of the relays 17, 18 and 19. The completion of this circuit effects separation of the contact members of the relay 17 to insert a resistor 15 in the field circuit of the exciter generator and thereby decrease the excitation of the field winding 3 and, consequently, the voltage of the balancer generator, thus also decreasing the energy supplied thereby to the power line.

Assuming now that the balancer machine is operating as a motor, drawing power from the line 6—7, and that the excitation is reduced by the action of the regulator 16 to a point where the armature current is approaching an unsafe value, the armature of the relay 23 will be drawn down against the action of the spring 64, thereby separating the contact members 49, which are in series-circuit relation with the regulator contact members 36 and 37. Separating the contact members 49 operates to effect engagement of the contact members of the relay 17, thereby shunting the resistor 15 and increasing the excitation of the field winding 13. Consequently, the excitation of the field winding 3 is increased, thereby reducing the inflow of current to the armature 2 of the main machine.

It will be noted that the relay 17 is of the inverted type. That is to say, the relay contact members are separated while the main regulator contact members 36—37 are in engagement, so that the relay contact members operate oppositely to the regulator contact members. In the system illustrated and described above, the field winding 13 of the exciter generator is separately excited. With a self-excited field winding, the inverted type of relay 17 would not be utilized for controlling the field resistor 15, but a direct-acting relay, similar to relay 18, would be employed.

Many modifications of my invention, as illustrated and described, may be made without departing from the spirit thereof, and I do not wish to be limited other than by the scope of the appended claims.

I claim as my invention:

1. In a regulator system, a balancer set comprising a dynamo-electric machine adapted to act as a motor or as a generator and having a field-magnet winding, means comprising a regulator for controlling the excitation of said field-magnet winding, current-limiting means for said machine for preventing excessive motor current, and current-limiting means for said machine for preventing excessive generator current.

2. In a regulator system, a dynamo-electric machine having a field winding, means for regulating the excitation of said field winding comprising a pair of contact members, and load-limiting means for said machine comprising two pairs of contact members, one pair connected in series-circuit relation with, and the other pair connected in parallel-circuit relation to, said first-named contact members.

3. In a regulator system, a dynamo-electric machine having a field winding, means for regulating the excitation of said field winding comprising a control circuit and contact members for governing said control circuit, independent means actuated in accordance with certain load conditions upon said machine for maintaining said control circuit closed, and independent means actuated in accordance with certain load conditions upon said machine for maintaining said control circuit open.

4. In a regulator system, a dynamo-electric machine having a field winding and capable of acting either as a motor or as a generator, regulator means for controlling the excitation of said field winding, and means actuated in accordance with the load conditions of said machine for interrupting the control of said regulator means, said means comprising a pair of relays, one of which is responsive to motor load, and the other of which is responsive to generator load of said machine.

5. In a regulator system, a dynamo-electric machine having a field winding and capable of acting either as a motor or as a generator, means for controlling the excitation of said field winding, current-limiting means for said machine sensitive to motoring current thereof, and current-limiting means for said machine sensitive to generator current thereof.

6. In a regulator system, a power circuit, a source of energy supply for said power circuit, an energy-translating device connected to said power circuit, regulating means for governing the flow of energy between said power circuit and said translating device, and means energized in accordance with the watts of said translating device for interrupting the governing action of said regulating means to limit said flow of energy.

7. In a regulator system, a power circuit, a source of energy supply for said power circuit, a dynamo-electric machine connected to said power circuit, said machine being provided with a field winding, regulator means for controlling the excitation of said field winding in accordance with the load on said source of energy supply, and means for limiting the operation of said regulator means comprising a relay having voltage and current coils actuated in accordance with the load on said dynamo-electric machine.

8. In a regulator system, a power circuit, a source of energy supply for said power circuit, a dynamo-electric machine connected to said power circuit, said machine being provided with a field winding, regulator means for controlling the excitation of said field winding in accordance with the load on said source of energy supply, and means for limiting the operation of said regulator means to prevent overloading said dynamo-electric machine, said means comprising means sensitive to motoring load on said machine and means sensitive to generating load on said machine.

9. In a regulator system, a power circuit, a source of energy supply for said power circuit, a dynamo-electric machine connected to said power circuit and provided with a field winding, a control circuit and regulator means connected thereto for governing the excitation of said field winding, and load-limiting means for said machine comprising contact members connected to said control circuit in parallel-circuit relation to said regulator means, contact members connected in series-circuit relation with said regulator means and means for actuating said contact members in accordance with the load conditions of said dynamo-electric machine.

10. In a regulator system, a power circuit, a source of energy supply for said power circuit, a dynamo-electric machine connected to said power circuit and adapted to function as a motor or as a generator, a field winding for said machine, vibratory regulator means actuated in accordance with the load on said power circuit for controlling the excitation of said field winding, and load-limiting means for said machine comprising a pair of watt relays for interrupting the control of said regulator, one of said relays being connected to be sensitive to motor load upon said machine and another of said relays being connected to be sensitive to generator load upon said machine.

11. In a regulator system, a dynamo-electric machine having a field winding, means for controlling the excitation of said field winding, current-limiting means for said machine sensitive to motoring current thereof, current-limiting means for said machine sensitive to generator current thereof, and means for effecting a vibratory action of said current-limiting means to prevent hunting action thereof.

12. In a regulator system, a dynamo-electric machine having a field winding, means for regulating the excitation of said field winding comprising a pair of contact members, load-limiting means for said machine comprising two pairs of contact members, one pair connected in series-circuit relation with, and the other pair connected in parallel-circuit relation to, said regulator contact members, and means for effecting a vibratory action of said two pairs of contact members to prevent hunting action.

13. In a regulator system, a dynamo-electric machine having a field winding, means for controlling the excitation of said field winding, current limiting means for said machines comprising a pair of relays, one of said relays being effective to limit a decrease in the excitation of said machine, and the other of said relays being effective to limit an increase in the excitation of said machine.

14. In a regulator system, a dynamo-electric machine having a field-winding, means for controlling the excitation of said field winding, means for limiting a decrease in the excitation of said machine to prevent excessive motor loads, means for limiting an increase in the excitation of said machine to prevent excessive generator loads.

15. In a regulator system, a dynamo-electric machine having a field winding, means for controlling the excitation of said field-winding, load-limiting means for said machine comprising a pair of relays each having voltage and current coils, one of said relays being effective for limiting a decrease in the excitation of said machine to prevent excessive motor loads, the other of said relays being effective to limit an increase in the excitation of said machine to prevent excessive generator loads.

In testimony whereof, I have hereunto subscribed my name this 19th day of June, 1924.

JOHN H. ASHBAUGH.